United States Patent
Tartamella et al.

(10) Patent No.: US 10,933,392 B2
(45) Date of Patent: Mar. 2, 2021

(54) CATALYST DELIVERY SYSTEM FOR POLYMERIZATION VESSEL

(71) Applicant: Bridgestone Corporation, Chuo-ku (JP)

(72) Inventors: Timothy L. Tartamella, Silver Lake, OH (US); Joseph P. Padolewski, Copley, OH (US)

(73) Assignee: Bridgestone Corporation, Chuo-ku (JP)

( * ) Notice: Subject to any disclaimer, the term of this patent is extended or adjusted under 35 U.S.C. 154(b) by 114 days.

(21) Appl. No.: 16/345,834

(22) PCT Filed: Oct. 31, 2017

(86) PCT No.: PCT/US2017/059287
§ 371 (c)(1),
(2) Date: Apr. 29, 2019

(87) PCT Pub. No.: WO2018/081796
PCT Pub. Date: May 3, 2018

(65) Prior Publication Data
US 2019/0255497 A1     Aug. 22, 2019

Related U.S. Application Data

(60) Provisional application No. 62/414,852, filed on Oct. 31, 2016.

(51) Int. Cl.
*B01J 10/00*     (2006.01)
*C08F 36/06*     (2006.01)
(Continued)

(52) U.S. Cl.
CPC ............... *B01J 4/007* (2013.01); *B01J 4/008* (2013.01); *B01J 8/002* (2013.01); *B01J 8/0035* (2013.01); *B01J 10/00* (2013.01); *C08F 36/06* (2013.01)

(58) Field of Classification Search
CPC ... B01J 4/007; B01J 4/008; B01J 8/002; B01J 8/0035; B01J 10/00; C08F 36/06
(Continued)

(56) References Cited

U.S. PATENT DOCUMENTS 2,807,393 A * 9/1957 Metrailer ........... B65G 53/4683
                                                    406/76
3,160,105 A    12/1964 Sherman et al.
(Continued)

FOREIGN PATENT DOCUMENTS

CN           201132114 Y      10/2008
CN           103052440 A       4/2013
(Continued)

OTHER PUBLICATIONS

An Office Action issued in corresponding Japanese Patent Application No. 2019-523073; dated Sep. 1, 2020.

*Primary Examiner* — William K Cheung
(74) *Attorney, Agent, or Firm* — Meredith E. Hooker; J. Gregory Chrisman

(57) ABSTRACT

Described herein are systems and methods for delivering catalyst to a reaction vessel. The methods include the use of a positive displacement reciprocating piston system having a catalyst delivery housing that contains a piston system. The piston system includes a top section, a bottom section, and a catalyst holding space between the top and bottom section such that the piston system is movable between a first and a second position to inject catalyst from the catalyst holding space into the reaction vessel when the piston system is in the second position and fill the catalyst holding space with catalyst from a catalyst feed supply when the piston system is in the first position.

20 Claims, 3 Drawing Sheets

(51) Int. Cl.
*B01J 8/02* (2006.01)
*B01J 4/00* (2006.01)
*B01J 8/00* (2006.01)

(58) Field of Classification Search
USPC .......................................................... 526/62
See application file for complete search history.

(56) References Cited

U.S. PATENT DOCUMENTS

| | | |
|---|---|---|
| 3,726,845 A | 4/1973 | Nickerson et al. |
| 4,690,804 A | 9/1987 | Rohlfing |
| 5,098,667 A | 3/1992 | Young et al. |
| 5,284,423 A | 2/1994 | Holdsworth et al. |
| 5,385,992 A | 1/1995 | Koskinen et al. |
| 5,421,295 A | 6/1995 | Lemaire et al. |
| 5,948,871 A | 9/1999 | Goode et al. |
| 6,426,394 B1 | 7/2002 | Erickson et al. |
| 7,632,395 B2 | 12/2009 | Evans |
| 8,765,884 B2 | 7/2014 | McElvain et al. |
| 8,846,831 B2 | 9/2014 | Dewachter et al. |
| 8,962,775 B2 | 2/2015 | Hoang et al. |
| 2005/0106080 A1 | 5/2005 | Evans et al. |
| 2014/0256889 A1 | 9/2014 | McElvain et al. |

FOREIGN PATENT DOCUMENTS

| | | |
|---|---|---|
| DE | 3049510 A1 | 7/1982 |
| EP | 0451942 A1 | 10/1991 |
| GB | 1435645 A | 5/1976 |
| JP | S5465964 A | 5/1979 |
| WO | 9216747 | 10/1992 |

\* cited by examiner

US 10,933,392 B2

CATALYST DELIVERY SYSTEM FOR POLYMERIZATION VESSEL

The present application is a 35 U.S.C. 371 national stage application of PCT International Application No. PCT/US2017/059287, filed on Oct. 31, 2017, which claims the benefit of U.S. Provisional Patent App. No. 62/414,852, filed Oct. 31, 2016, the entire disclosures of both of which are hereby incorporated by reference as if set forth in their entireties herein.

TECHNICAL FIELD

The present disclosure relates to a catalyst delivery system for delivering a catalyst to a reaction vessel, and more particularly, a positive displacement catalyst delivery system for delivering a catalyst suitable for polymerizing a conjugated diene monomer into a polydiene polymer in a polymerization reaction vessel.

BACKGROUND

Catalysts that facilitate the polymerization of monomers to produce polymers are typically delivered to polymerization reaction vessels using metering technology in order to deliver a precise amount of catalyst. There are difficulties that arise in using such technology. For example, when the inside of the reaction vessel is at equilibrium, monomer can exist in the vapor state. At the point in which catalyst enters the reaction vessel, the monomer vapor can react with the catalyst to produce a polymer. This polymer can build-up along the walls of the reaction vessel near the point where catalyst is fed into the reaction vessel, which can prevent and disrupt catalyst flow into the reaction vessel. Furthermore, monomer vapor can make its way into the catalyst feed lines and react with catalyst therein to produce polymer. This polymer can further clog and foul the feed lines, such as along the feed line walls and at or near valves inside the feed lines. These occurrences are typically undesirable as they lead to downtime in order to remove any undesired build-up of polymer and/or replace any of the catalyst delivery equipment.

There is an interest in a catalyst delivery system that reduces the amount of clogging and fouling due to undesired polymer build-up that leads to downtime for cleaning and/or replacing of components of the catalyst delivery system. It is an objective of the present disclosure to overcome one or more difficulties related to the prior art. It has been found that a catalyst delivery system that incorporates a positive displacement reciprocating pump system can be used in order to greatly reduce if not eliminate undesired polymer build-up in the catalyst delivery system.

SUMMARY

In a first aspect, there is a system for producing a polymer by polymerizing a monomer using a catalyst. The system includes a polymerization reaction vessel having a cavity which contains a monomer, the polymerization reaction vessel further has an opening for introducing catalyst into the cavity of the polymerization reaction vessel. A positive displacement reciprocating piston system is connected to the polymerization reaction vessel. The positive displacement reciprocating system includes a catalyst delivery housing connected to the opening of the polymerization reaction vessel, a catalyst feed supply connected to the catalyst delivery housing such that catalyst can be fed from the catalyst feed supply into the catalyst delivery housing, and a piston system positioned inside the catalyst delivery housing, the piston system includes a piston having a top section and a bottom section attached to one another and an annular catalyst holding space between the top section and the bottom section of the piston, and the piston is movable between a first position and second position. The annular catalyst holding space is suitable to be filled with catalyst from the catalyst feed supply when the piston is in the first position, and catalyst is discharged from the annular catalyst holding space into the cavity of the polymerization reaction vessel through the opening of the polymerization reaction vessel when the piston system is in the second position.

In an example of aspect 1, the bottom section of the piston is shaped such that no catalyst in the annular catalyst holding space can flow past or through the bottom section of the piston through the opening of the polymerization reaction vessel when the piston is in the first position.

In another example of aspect 1, catalyst in the annular catalyst holding space is separated from the opening of the polymerization reaction vessel by the bottom section of the piston when the piston is in the first position.

In another example of aspect 1, catalyst in the catalyst feed supply is blocked from the annular catalyst holding space by the top section of the piston when the piston is in the second position.

In another example of aspect 1, a portion of the bottom section of the piston extends into the cavity of the polymerization reaction vessel when the piston is in the second position.

In another example of aspect 1, the bottom section of the piston is composed of a non-metal material.

In another example of aspect 1, the system further includes a cam driven by a motor to move the piston between the first position and the second position. The system can further include a catalyst reservoir containing a catalyst in fluid communication with the catalyst feed supply such that the catalyst can be fed from the catalyst reservoir to the catalyst delivery housing through the catalyst feed supply.

In another example of aspect 1, the catalyst is suitable for producing a butadiene-containing polymer.

In another example of aspect 1, the catalyst is a metal-based catalyst selected from the group consisting of alkali metal-based catalysts, alkaline earth metal-based, and transition metal-based catalysts.

In another example of aspect 1, the catalyst is a metal-based catalyst and is selected from the group consisting of lithium-based, sodium-based, titanium-based, cobalt-based, nickel-based, and palladium-based catalysts.

In another example of aspect 1, the catalyst is a metal-based catalyst and is a transition metal-based catalyst selected from the group consisting of scandium-based, yttrium-based, and lanthanide metal-based catalysts.

The first aspect may be provided alone or in combination with any one or more of the examples of the first aspect discussed above.

In a second aspect, there is a method of producing a polymer by polymerizing a monomer using a catalyst. The method includes feeding catalyst from a catalyst feed supply to a catalyst holding space of a catalyst delivery housing of a positive displacement reciprocating piston system, the catalyst delivery housing being connected to an opening of a polymerization reaction vessel for introducing the catalyst from the catalyst holding space to a monomer-containing cavity in the polymerization reaction vessel; reciprocating a piston of the positive displacement reciprocating piston system from a first position to a second position to introduce catalyst to the polymerization reaction vessel through the opening, wherein the catalyst in the catalyst holding space is discharged into the polymerization reaction vessel during reciprocation of the piston from the first position to the second position.

In an example of aspect 2, the method further includes the piston having a top section and a bottom section connected to one another and the catalyst holding space being between the top section and the bottom section.

In another example of aspect 2, the top section of the piston is connected to a cam, and the cam is driven by a motor to move the piston between the first position and the second position.

In another example of aspect 2, the bottom section of the piston is shaped such that no catalyst in the catalyst holding space can flow past or through the bottom section of the piston when the piston is in the first position.

In another example of aspect 2, catalyst in the catalyst feed supply is blocked from the catalyst holding space by the top section of the piston when the piston is in the second position.

In another example of aspect 2, the method further includes feeding the catalyst to the catalyst holding space from a catalyst reservoir that is connected to the catalyst feed supply.

In another example of aspect 2, the catalyst is suitable for producing a butadiene-containing polymer.

In another example of aspect 2, the catalyst is a metal-based catalyst selected from the group consisting of alkali metal-based catalysts, alkaline earth metal-based, and transition metal-based catalysts.

The second aspect may be provided alone or in combination with any one or more of the examples of the second aspect discussed above, or with any one or more of the examples of the first aspect.

It is to be understood that various features disclosed in this specification and in the drawings can be used in any and all combinations. By way of non-limiting example the various features may be combined with one another as set forth in the specification as aspects.

BRIEF DESCRIPTION OF THE DRAWINGS

The accompanying drawings are included to provide a further understanding of principles of the invention, and are incorporated in and constitute a part of this specification. The drawings illustrate one or more embodiment(s), and together with the description serve to explain, by way of example, principles and operation of the invention. It is to be understood that various features disclosed in this specification and in the drawings can be used in any and all combinations. By way of non-limiting example the various features may be combined with one another as set forth in the specification as aspects.

DETAILED DESCRIPTION

The terminology as set forth herein is for description of the embodiments only and should not be construed as limiting the invention as a whole. Directional terms as used herein (e.g., up, down, right left, front, back, top, bottom) are made only with reference to the figures as drawn and are not intended to imply absolute orientation.

Herein, when a range such as 5-25 (or 5 to 25) is given, this means preferably at least or more than 5 and, separately and independently, preferably not more than or less than 25. In an example, such a range defines independently at least 5, and separately and independently, not more than 25.

Catalyst Delivery System

Figure 1:
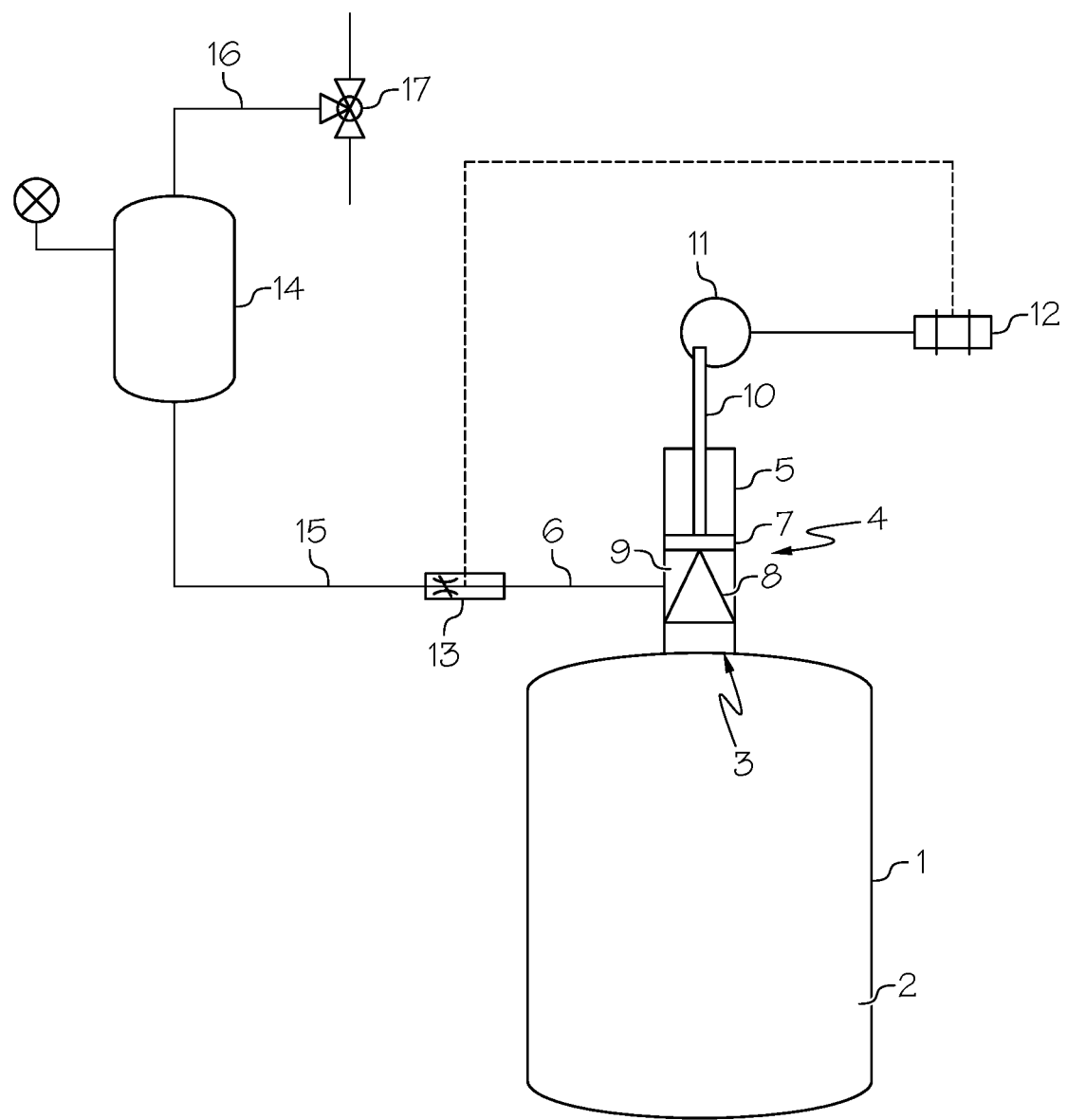
FIG. 1 is a schematic view of a system for introducing a catalyst to a reaction vessel, including a positive displacement reciprocating piston system, wherein the piston system is shown in a first position.
Figure 3:
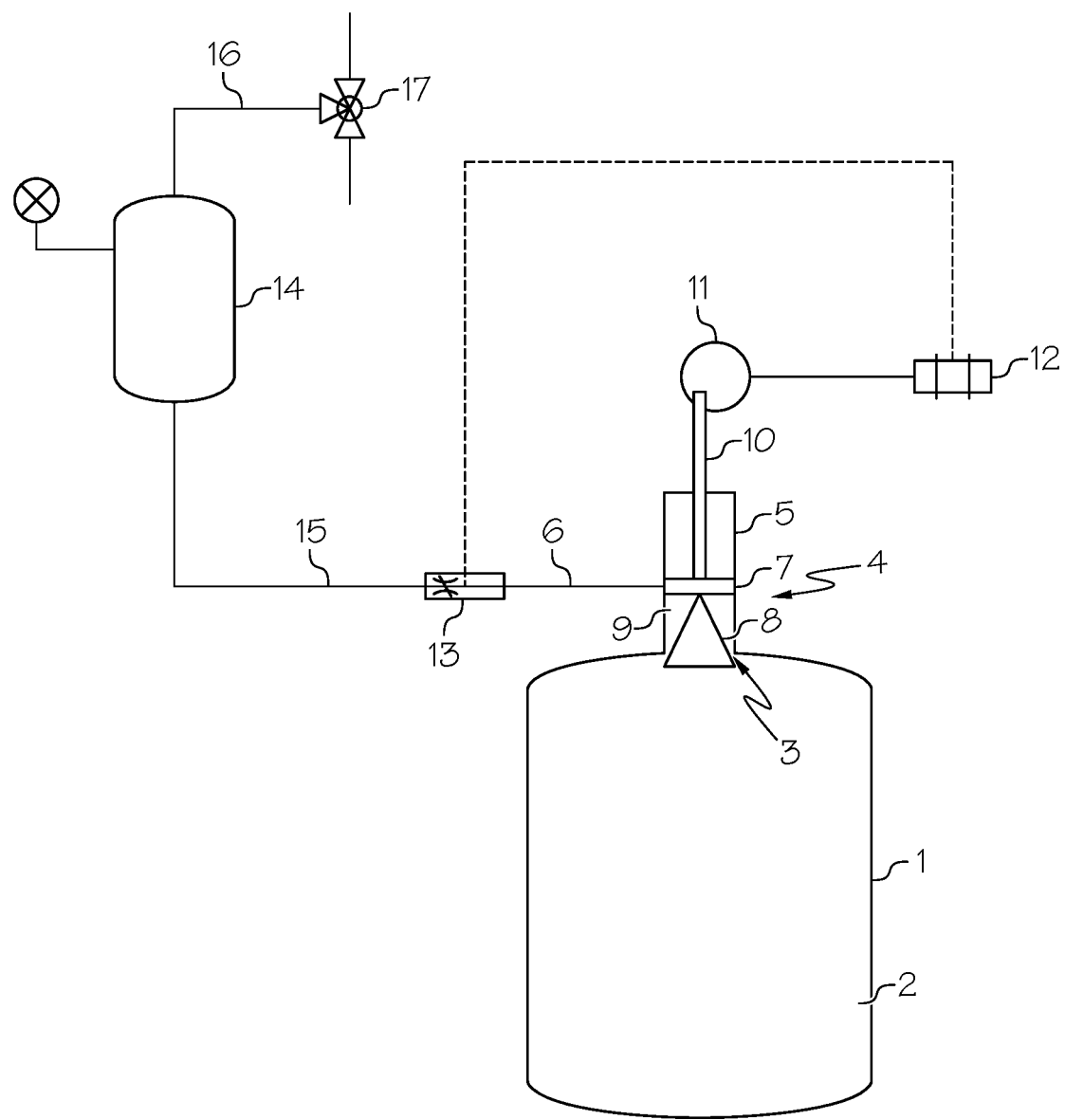
FIG. 3 is a schematic view of a system for introducing a catalyst to a reaction vessel, including a positive displacement reciprocating piston system, wherein the piston system is shown in a second position.

The present disclosure relates to systems and methods for delivering a catalyst into a reaction vessel. As shown in FIGS. 1 and 3, a reaction vessel 1 has a cavity 2 for carrying out polymerization reactions. Catalyst can be fed into cavity 2 of reaction vessel 1 through opening 3. As shown, opening 3 is positioned on top of a vertically arranged reaction vessel 1. Alternatively, an opening for feeding catalyst to a vessel cavity can be arranged at any suitable location on a vessel. Catalyst is fed to reaction vessel 1 by a positive displacement reciprocating piston system 4.

The positive displacement reciprocating piston system 4 includes a catalyst delivery housing 5 connected to (e.g., mounted against and in register) with opening 3 such that catalyst inside housing 5 can be delivered through opening 3 into the cavity 2. Housing 5 is preferably an annular housing having an internal cavity for accommodating catalyst and moving components of the system for delivering catalyst to vessel 1. Catalyst can be delivered into the catalyst delivery housing 5 through a catalyst feed supply 6, for example, a transfer pipe connected or mounted to housing 5. The positive displacement reciprocating piston system 4 also includes a piston system that includes a top section 7 and a bottom section 8 that are attached to one another. Top section 7 and bottom section 8 can be connected by conventional techniques, for instance, with a mechanical fastener (e.g. bolt, screw, clip) or by welding. Alternatively, top section 7 and bottom section 8 can be integral to one another. As shown arranged in housing 5, bottom section 8 is positioned between opening 3 of vessel 1 and top section 7.

Top section 7 can have any suitable shape, for example, a solid cylinder or piston as shown, and is movable or slidable within housing 5 and moves up and down during delivery of catalyst to vessel 1. Bottom section 8 can have any suitable shape, for example, a cone as shown or a flexible plunger (e.g., a dome), and is movable or slidable within housing 5. Being connected, top section 7 and bottom section 8 move together equally within housing 5 as system 4 reciprocates during operation.

As shown, the piston system of system 4 is in a first position, which can align the catalyst feed supply 6 in fluid connection with housing 5 below top section 7 to deliver catalyst to catalyst holding space 9. The open cavity area in housing 5 between the bottom surface of top section 7 (i.e. facing towards opening 3) and the top surface of bottom section 8 (i.e. facing away from opening 3) functions as a catalyst holding space 9 where catalyst can be held before being delivered to cavity 2 of reaction vessel 1. FIG. 1 shows the catalyst holding space 9 as being a closed space defined by the interior walls of housing 5 and the top and bottom surfaces of sections 8 and 7, respectively. As described below, holding space 9, in the first position, is sealed in housing 5 such that catalyst is prevented from flowing past or through top section 7 and bottom section 8. As shown, top section 7 and bottom section 8 are solid components of the piston system. The top section 7 and bottom section 8 fit within housing 5 without accommodating openings around or therethrough.

Figure 2:
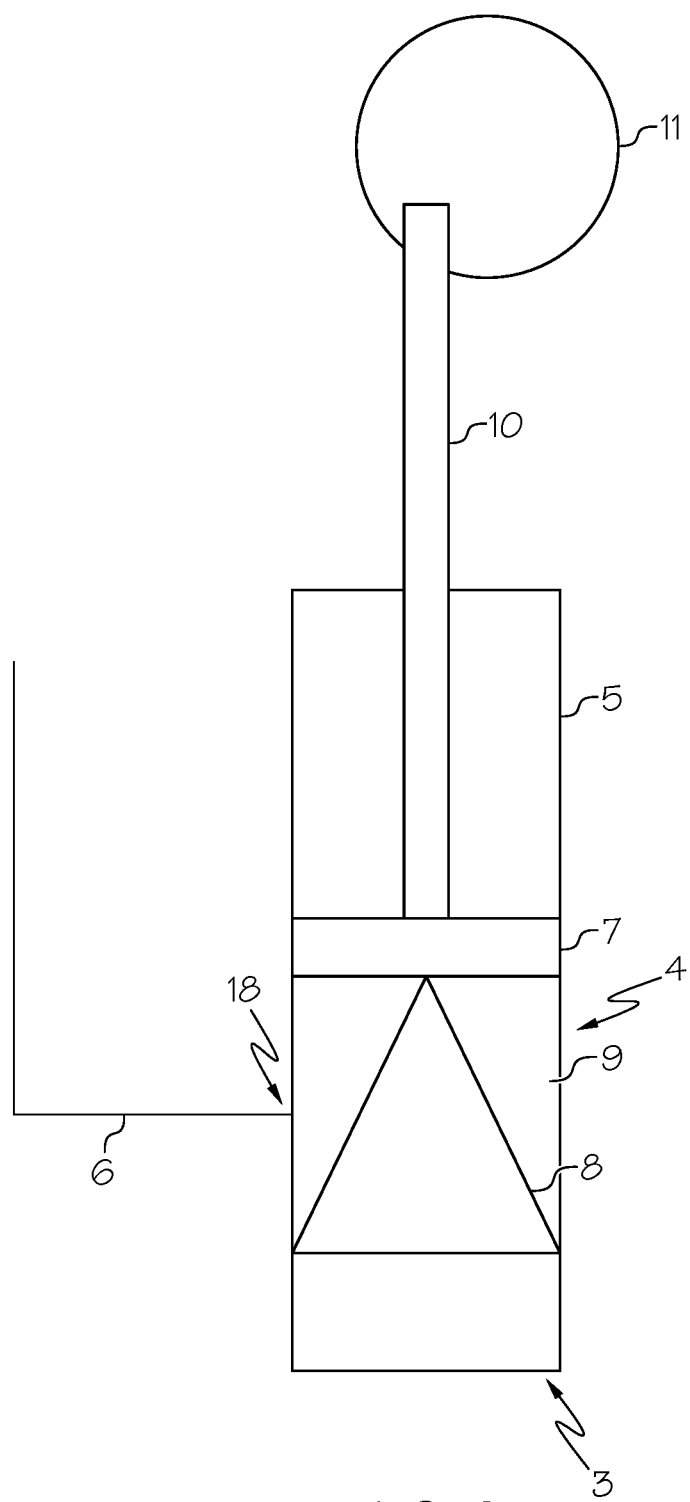
FIG. 2 is a schematic view of a positive displacement reciprocating piston system, wherein the piston system is in a first position.

The positive displacement reciprocating piston system 4 also includes means for moving or cycling the piston system back and forth repeatedly between a first position (as shown in FIGS. 1 and 2) and a second position (as shown in FIG. 3). An example of suitable means as shown in FIGS. 1-3 includes a piston shaft 10 connected to top section 7 (e.g., by a mechanical fastener) of the piston system and a rotatable cam 11 connected to a means for actuating cam 11, for example, a motor 12. Motor 12 drives and spins cam 11 such that it moves the piston shaft 10 up and down or back and forth depending on arrangement (e.g., horizontal or vertical) of system 4. In being moved up and down, piston shaft 10 moves the piston system (top section 7 and bottom section 8) between a first position and a second position to facilitate delivery of catalyst from housing 5 to vessel 1. Motor 12 can be in communication with a flow indicator 13 such that the motor only operates when catalyst is present or flowing in catalyst feed supply 6. In another example, motor 12 can be controlled by a flow control valve in catalyst feed supply 6 to control the motor speed and adjust catalyst flow rate. Generally, motor speed can be set (e.g., constant) or adjusted as desired to control the amount of catalyst being delivered to vessel 1. Depending on the type or particular polymerization being carried out in vessel 1 (e.g., polymerization of a conjugated diene monomer), the amount of catalyst being fed to vessel 1 can be adjusted to accommodate reaction requirements.

Catalyst can be stored in catalyst reservoir 14, which has a catalyst reservoir outlet 15 and a catalyst reservoir inlet 16. Catalyst can be fed to the catalyst reservoir inlet 16 through valve 17, which can also allow an inert gas into the catalyst reservoir inlet 16 to maintain a particular pressure in the catalyst reservoir 14. Outlet 15 of reservoir 14 is fluid communication with positive displacement reciprocating piston system 4, for example, by a transfer pipe. As shown, outlet 15 is connected to flow indicator 13, however, outlet 15 can be directly connected to system 14 without an indicator or other in-line equipment or components present. Reservoir 14 can be pressurized (e.g., head space is filled with compressed inert gas) to force catalyst to flow to housing 5 and catalyst holding space 9 for delivery of catalyst to vessel 1. Alternatively, a pump (e.g., an air diaphragm pump) can be used to transfer catalyst from reservoir 14 to positive displacement reciprocating piston system 4. As shown in FIG. 2, catalyst feed supply 6 has an opening 18 that allows catalyst to enter the catalyst holding space 9 of housing 5. Preferably, opening 18 is formed by the end of a pipe that is connected to housing 5 such that opening 18 is in constant fluid communication with the piston system whether opening 18 is aligned with the catalyst holding space 9, top section 7 or bottom section 8 or portions or combinations thereof.

The piston system is preferably shaped such that at least a portion of both the top section 7 and the bottom section 8 have an outer circumference portion that abuts and is in contact with the interior wall(s) of the catalyst delivery housing 5. For example, the portion of top section 7 that is in contact with the interior wall of housing 5 can include a seal material such as a Teflon ring. Bottom section 8 can similarly include a seal material in the portion that is in contact with the interior wall of housing 5. In this manner, catalyst in catalyst holding space 9 is securely stored in space 9 without leakage. That is, catalyst is prevented from flowing around or through top section 7 and bottom section 8 of the piston system when the piston system is in the first position, or around or through top section 7 when the portion of bottom section 8 that contacts the interior wall of housing 5 is extended into cavity 2 of vessel 1.

Additionally, as shown in FIG. 3, with this configuration, top section 7 can block opening 18 to prevent catalyst from entering catalyst delivery housing 5 when the piston system is in the second position. In another example configuration, top section 7 (e.g., the bottom surface) remains above opening 18 in the second position as catalyst is delivered to vessel 1. In yet another example, a portion of top section 7 can block a portion of opening 18 in the second position.

The bottom section 8 of the piston system is also preferably shaped such that when the piston system is in the second position, catalyst in holding space 9 can pass through opening 3 into cavity 2 of the reaction vessel. For example, this can be achieved when the portion of the bottom section 8 that seals catalyst holding space 9 extends into cavity 2 of vessel 1. Generally, bottom section 8 has a portion with an outer circumference that is same or slightly larger than opening 3. For example, the portion of bottom section 8 that seals catalyst in holding space 9 can flex or be compressible such that it presses on the interior wall of housing 5 and as that portion is pushed through opening 3 it can extend outward (e.g., radially). An example of a bottom section shape is shown in FIG. 3 wherein the bottom section is conical, which can be a solid cone or a cone shape having a hollowed out or open cavity section that faces towards opening 3. The conical section can be made from a plastic or polymeric material or a coated metal part. As can be seen, this shape allows catalyst to flow from the catalyst holding space 9 into the cavity 2 of the reaction vessel 1 as the bottom of the cone is moved through opening 3 and into cavity 2. Furthermore, this shape creates an annular catalyst holding space. Also preferably, the piston system is configured such that a portion of bottom section 8 extends into the cavity 2 of the reaction vessel 1 when the piston is in the second position, for example, as shown in FIG. 3.

The components of the catalyst delivery system described herein can be made of any suitable material, for example, metal (e.g., stainless steel, alloys), ceramics, plastic, glass and combinations thereof.

The reciprocating action of the piston system, as well as the shape of the components of the piston system, can help to prevent accumulation of undesirable build-up at opening 3. For example, the shape of the bottom of bottom section 8 can break off any build-up at or near opening 3 such that it falls into cavity 2 of reaction vessel 1. Furthermore, should any undesirable build-up be formed inside the catalyst holding space 9, the shape and reciprocating action of the piston system can break off any such build up that forms along the interior walls of the catalyst delivery housing 5 such that it is carried into cavity 2 of reaction vessel 1 along with catalyst when the piston system moves to the second position.

The positive displacement reciprocating system 4 also provides a cyclic supply of catalyst to vessel 1. The cyclic nature of the system 4 prevents monomer or monomer vapor (e.g., in the head space of the vessel) from entering or contacting the catalyst supply feed 6 and thus forming plugs or otherwise clogging the catalyst supply. This is advantageous as compared to continuous direct feed systems that permit monomer or monomer vapor to contact catalyst in a catalyst feed line. Further, in the instance the system 4 is not operating, and the piston system is in the first position, the catalyst holding space 9 is sealed from opening 3 and cavity 2 by bottom section 8 thereby preventing catalyst from contacting contents in vessel 1, for example, monomer vapor.

A preferred path that the catalyst can follow from when it is introduced to the system until it is fed to the reactor will now be described. The catalyst is fed through valve 17 into catalyst reservoir inlet 16 along with or without an inert gas which both can then enter catalyst reservoir 14. The internal pressure of catalyst reservoir 14 is kept constant so that the pressure of the catalyst throughout the downstream sections remains constant until the catalyst is delivered to the reactor. Catalyst from catalyst reservoir 14 flows through catalyst reservoir outlet 15, past flow indicator 13, and into catalyst feed supply 6. The flow indicator 13 is in communication with motor 12, and indicates to the motor that there is catalyst is in the system. Catalyst in catalyst feed supply 6 flows through opening 18 into catalyst delivery housing 5; specifically catalyst holding space 9 between top section 7 and bottom section 8 of the piston system. The catalyst fills up all the available open space in catalyst holding space 9, in an amount in relation to the pressure of the catalyst reservoir 14. Maintaining a constant pressure in the system allows for the amount of catalyst in catalyst holding space 9 to stay constant throughout repeated fillings of catalyst holding space 9. When desired, motor 12 drives cam 11, which moves piston shaft 10 down such that the piston system is in the second position (i.e. catalyst holding space 9 is in fluid communication with cavity 2). As mentioned above, top section 7 of the piston system blocks opening 18 to prevent catalyst from entering catalyst delivery housing 5. Additionally, the catalyst in catalyst holding space 9 flows into the cavity 2 of reaction vessel 1 through the gap created between opening 3 and bottom section 8 (as shown in FIG. 3). Once an appropriate amount of time has passed such that all the catalyst that was in catalyst holding space 9 has entered cavity 2, cam 11 is driven by motor 12 to return the piston shaft 10 upward and therefore the piston system to the first position (i.e. catalyst holding space 9 is not in fluid communication with cavity 2). Once returned to the first position, the pressure of the catalyst in the system forces more catalyst into catalyst holding space 9 (now empty), which is then ready to be delivered to cavity 2 of reaction vessel 1 following the same procedure described above.

In combination with the ability to have a fixed amount of catalyst be delivered to cavity 2 of reaction vessel 1 during each stroke of the piston system as described above, the timing and frequency of the strokes can be made such that a particular and desirable flow rate of catalyst is delivered to reaction vessel 1.

Catalysts

The catalyst delivery system described herein can be used with any catalyst for any reaction. An example of suitable reactions includes polymerization reactions of monomers. For example, the catalyst delivery system can supply catalyst to a chain polymerization reaction (e.g., polymerization mechanisms such as radical or free-radical, cationic, anionic, and coordination). The polymerization reactions of the present disclosure can include bulk polymerization systems and solution polymerization systems. The monomers that can be polymerized according to the bulk process of this disclosure can vary, for example, they can be volatile monomers and optionally non-volatile monomers. Volatile monomers can include those that are sufficiently volatile to allow heat removal by vaporization of unreacted monomer at a rate equal to the rate at which heat is generated by the polymerization reaction and at a temperature that will allow the formation of the desired polymer product.

In one or more embodiments, the catalyst delivery system can be used to supply catalyst (e.g., lanthanide-containing catalyst system) to carry out a coordination polymerization, for example, particularly those that react conjugated diene monomers to produce polydiene polymers. Such polymers include polybutadiene as well as copolymers containing butadiene, such as acrylonitrile butadiene styrene, acrylonitrile butadiene, and styrene-butadiene. Further examples of monomer suitable for use with the catalyst delivery system include, but are not limited to, 1,3-butadiene, isoprene, 1,3-pentadiene, 1,3-hexadiene, 2,3-dimethyl-1,3-butadiene, 2-ethyl-1,3-butadiene, 2-methyl-1,3-penta-diene, 3-methyl-1,3-pentadiene, 4-methyl-1,3-pentadiene, 2,4-hexadiene and combinations thereof. In another example, useful olefins include ethylene, propylene, 1-butene, and 1-pentene.

In one or more embodiments, the polymers prepared according to this disclosure can be vulcanizable, for example, for the production of tires (e.g., vehicle tires). In one or more embodiments, the polymers can have a glass transition temperature ($T_g$) that is less than 0° C., less than −20° C., or less than −30° C. In one example, the polymers can exhibit a single glass transition temperature. In another example, the polymers may be hydrogenated or partially hydrogenated.

In one or more embodiments, the polymers of this disclosure may be cis-1,4-polydienes having a cis-1,4-linkage content that is greater than 97%, greater than 97.5%, greater than 98.0%, or greater than 98.5%, where the percentages are based upon the number of diene mer units adopting the cis-1,4-linkage versus the total number of diene mer units. The polymers can have a 1,2-linkage content that is less than about 1.0%, less than 0.8%, less than 0.7%, or less than 0.6%, where the percentages are based upon the number of diene mer units adopting the 1,2-linkage versus the total number of diene mer units. The balance of the diene mer units may adopt the trans-1,4-linkage.

Any suitable catalyst or catalyst system useful for polymerization reactions can be used in positive displacement reciprocating system 4. Catalysts that are used to produce diene-containing polymers are known in the art, and include alkali metal-based catalysts, alkaline earth metal-based, and transition metal-based catalysts. Particular examples of such catalysts include lithium-based, sodium-based, titanium-based, cobalt-based, nickel-based, palladium-based, scandium-based, yttrium-based, and lanthanide metal-based catalysts. For example, lanthanide catalyst systems are well known in the art as described in U.S. Pat. Nos. 3,297,667, 3,541,063, 3,794,604, 4,461,883, 4,444,903, 4,525,594, 4,699,960, 5,017,539, 5,428,119, 5,064,910, and 5,844,050, which are incorporated herein by reference.

The use of a catalyst system can be used with positive displacement reciprocating system 4. The catalyst system can contain a group of reagents that, when combined together and then aged for a period of time, form an active catalyst. An organic solvent may or may not be present during catalyst formation and depends whether a commercial catalyst reagent, or a synthetically prepared catalyst reagent, is used as a solution in an organic solvent. Preformed catalysts can include the combination of a small amount of conjugated diene monomer, a coordination catalyst such as a lanthanide reagent, one or more organoaluminum reagents, and a halogen-containing reagent that serves as a halogen source.

The examples of catalysts of this disclosure is not intended to be exhaustive and other known catalysts can be successfully used with the catalyst delivery system described herein. Furthermore, as new catalysts for producing butadiene-containing polymers are being researched in order to find improved catalysts that are, for example, more efficient or cheaper, it is contemplated that catalysts yet to be discovered can also be successfully used with the catalyst delivery system described herein.

The polymers produced by the polymerization reactions of this disclosure are particularly useful in preparing rubber compositions that can be used to manufacture tires and tire components. Rubber compounding techniques and the additives employed therein are generally disclosed in The Compounding and Vulcanization of Rubber, in Rubber Technology ($2^{nd}$ Ed. 1973).

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

The invention claimed is:

1. A system for producing a polymer by polymerizing a monomer using a catalyst, the system comprising:
   a polymerization reaction vessel comprising a cavity which comprises a monomer, the polymerization reaction vessel further comprising an opening for introducing catalyst into the cavity of the polymerization reaction vessel;
   a positive displacement reciprocating piston system, comprising:
      a catalyst delivery housing connected to the opening of the polymerization reaction vessel,
      a catalyst feed supply connected to the catalyst delivery housing such that catalyst can be fed from the catalyst feed supply into the catalyst delivery housing, and
      a piston system positioned inside the catalyst delivery housing, the piston system comprising a piston having a top section and a bottom section attached to one another and an annular catalyst holding space between the top section and the bottom section of the piston, the piston being movable between a first position and second position,
      wherein the annular catalyst holding space is suitable to be filled with catalyst from the catalyst feed supply when the piston is in the first position, and catalyst is discharged from the annular catalyst holding space into the cavity of the polymerization reaction vessel through the opening of the polymerization reaction vessel when the piston system is in the second position.

2. The system of claim 1, further comprising:
   a cam driven by a motor to move the piston between the first position and the second position.

3. The system of claim 1, the bottom section of the piston being shaped such that no catalyst in the annular catalyst holding space can flow past or through the bottom section of the piston through the opening of the polymerization reaction vessel when the piston is in the first position.

4. The system of claim 1, catalyst in the annular catalyst holding space being separated from the opening of the polymerization reaction vessel by the bottom section of the piston when the piston is in the first position.

5. The system of claim 1, catalyst in the catalyst feed supply being blocked from the annular catalyst holding space by the top section of the piston when the piston is in the second position.

6. The system of claim 1, a portion of the bottom section of the piston extending into the cavity of the polymerization reaction vessel when the piston is in the second position.

7. The system of claim 1, further comprising:
   a catalyst reservoir comprising a catalyst in fluid communication with the catalyst feed supply such that the catalyst can be fed from the catalyst reservoir to the catalyst delivery housing through the catalyst feed supply.

8. The system of claim 1, the catalyst being a metal-based catalyst selected from the group consisting of lithium-based, sodium-based, titanium-based, cobalt-based, nickel-based, palladium-based, scandium-based, yttirium-based, and lanthanide metal-based catalysts.

9. A method of producing a polymer by polymerizing a monomer using a catalyst, the method comprising:
   feeding catalyst from a catalyst feed supply to a catalyst holding space of a catalyst delivery housing of a positive displacement reciprocating piston system, the catalyst delivery housing being connected to an opening of a polymerization reaction vessel for introducing the catalyst from the catalyst holding space to a monomer-containing cavity in the polymerization reaction vessel;
   reciprocating a piston of the positive displacement reciprocating piston system from a first position to a second position to introduce catalyst to the polymerization reaction vessel through the opening, wherein the catalyst in the catalyst holding space is discharged into the polymerization reaction vessel during reciprocation of the piston from the first position to the second position.

10. The method of claim 9, further comprising:
    the piston having a top section and a bottom section connected to one another and the catalyst holding space being between the top section and the bottom section.

11. The method of claim 10, the top section of the piston connected to a cam, the cam driven by a motor to move the piston between the first position and the second position.

12. The method of claim 10, the bottom section of the piston being shaped such that no catalyst in the catalyst holding space can flow past or through the bottom section of the piston when the piston is in the first position.

13. The method of claim 9, further comprising:
    feeding the catalyst to the catalyst holding space from a catalyst reservoir being connected to the catalyst feed supply.

14. The method of claim 10, catalyst in the catalyst feed supply being blocked from the catalyst holding space by the top section of the piston when the piston is in the second position.

15. The method of claim 9, the catalyst being a metal-based catalyst selected from the group consisting of alkali metal-based catalysts, alkaline earth metal-based, and transition metal-based catalysts.

16. The system of claim 1, the bottom section of the piston being composed of a non-metal material.

17. The system of claim 1, the catalyst being suitable for producing a butadiene-containing polymer.

18. The system of claim 1, the monomer being a diene monomer.

19. The system of claim 1, the cavity of the polymerization vessel being open to the annular catalyst holding space when the piston system is in the second position and a portion of the bottom section of the piston extends into the cavity of the polymerization vessel.

20. The system of claim 1, the catalyst delivery housing having an inner surface that defines a portion of the annular catalyst holding space when the piston is in the first position.

* * * * *